(12) United States Patent
Liang

(10) Patent No.: US 8,345,359 B1
(45) Date of Patent: Jan. 1, 2013

(54) LENS SYSTEM

(75) Inventor: Kuo-Yen Liang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/236,618

(22) Filed: Sep. 19, 2011

(51) Int. Cl.
*G02B 9/12* (2006.01)
*G02B 3/02* (2006.01)
(52) U.S. Cl. .................. 359/791; 359/716; 359/784
(58) Field of Classification Search .............. 359/716, 359/784, 791
See application file for complete search history.

(56) References Cited

U.S. PATENT DOCUMENTS 7,742,242 B2 * 6/2010 Liang et al. ............... 359/791

FOREIGN PATENT DOCUMENTS

CN 101135767 A 3/2008

* cited by examiner

*Primary Examiner* — Jack Dinh
(74) *Attorney, Agent, or Firm* — Altis Law Group, Inc.

(57) ABSTRACT

A lens system includes, from an object-side to an image-side, a first lens with positive refractive power, an aperture stop, a second lens with positive refractive power, a third lens with negative refractive power, a color filter, and an image plane. The first lens includes a first surface facing the object-side and a second surface facing the image-side. The second lens includes a third surface facing the object-side and a fourth surface facing the image-side. The imaging lens satisfies the following conditions:

$0.26 < R1/F1 < 0.35;$ and $-0.65 < R2/F2 < -0.35.$

Wherein: R1 is a radius of curvature of the first surface; R2 is a radius of curvature of the second surface; F1 is a focal length of the first lens; F2 is a focal length of the second lens.

11 Claims, 10 Drawing Sheets

LENS SYSTEM

BACKGROUND

1. Technical Field

The disclosure relates to lens systems and, particularly, to a compact image lens having a small number of lens components and a short overall length.

2. Description of Related Art

There is a field of lens technology where lens modules for image acquisition having a short overall length are demanded. The lens modules are mounted in relatively thin devices, such as simple digital cameras, webcams for personal computers, and portable imaging systems in general. In order to satisfy this demand for compact lens systems, fewer lenses may be employed, but resolution will suffer.

Therefore, the demand is high to develop a lens system with a short overall length and an optical performance that matches image sensing chips having enhanced resolution.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the disclosure will now be described in detail below, with reference to the accompanying drawings.

Figure 1:
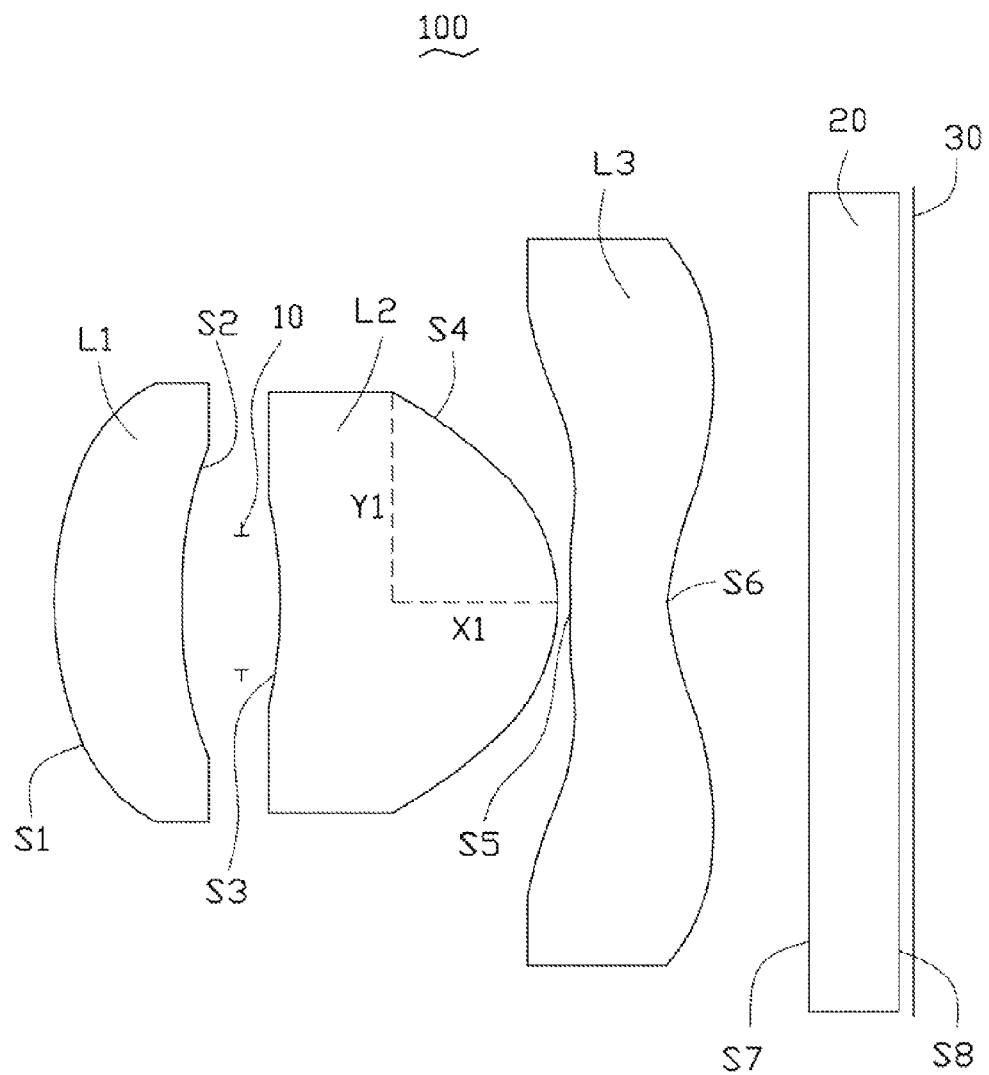
FIG. 1 is a schematic view of a lens system, according to an exemplary embodiment.

Referring to FIG. 1, a lens system 100 according to an embodiment, includes, in this order from the object-side to the image-side of the lens system 100, a first lens L1 with positive refraction power, a second lens L2 with positive refraction power, a third lens L3 with negative refraction power, a color filter 20, and an image plane 30.

The first lens L1 includes a first surface S1 and a second surface S2. The first surface S1 and the second surface S2 are arranged from the object-side to the image-side of the lens system 100. The first lens L1 has a meniscus shape with the first surface S1 convex toward the object-side of the lens system 100, and the second surface S2 concave toward the image-side of the lens system 100. The first surfaces S1 and the second surfaces S2 are aspherical. The first lens L1 is made of polycarbonate (PC).

The second lens L2 includes a third surface S3 and a fourth surface S4, from the object-side to the image-side of the lens system 100. Both the third surface S3 and the fourth surfaces S4 are aspherical. The third surface S3 is concave toward the object-side, and the fourth surface S4 is convex toward the image-side of the lens system 100. The second lens L2 is made of resin.

The lens system 100 further includes an aperture stop 10 installed between the first lens L1 and the second lens. L2. The aperture stop 10 is for adjusting light flux from the first lens L1 to the second lens L2. In addition; the aperture stop 10 facilitates uniform light transmission when light passes through the first lens L1 to correct coma aberrations of the lens system 100.

The third lens L3 includes a fifth surface S5 and a sixth surface S6, from the object-side to the image-side of the lens system 100. Both the fifth surface S5 and the sixth surface S6 are aspherical. A portion of the fifth surface S5 close to an optical axis of the lens system 100 is convex toward the object-side, and a portion of the sixth surface S6 close to the optical axis of the lens system 100 is concave toward the image-side of the lens system 100. The third lens L3 is also made of PC.

The color filter 20 includes, in the order from the object-side to the image-side of the lens system 100, a seventh surface S7 and an eighth surface S8.

To achieve the lens system 100 with a short overall length and excellent optical performance, the lens system 100 satisfies the following conditions:

$$0.26 < R1/F1 < 0.35; \quad (1)$$

and $$-0.65 < R2/F2 < -0.35; \quad (2)$$

Wherein: R1 is a radius of curvature of the first surface S1; F1 is a focal length of the first lens L1; R2 is a radius of curvature of the second surface S2; F2 is a focal length of the second lens L2.

In order to obtain low distortion, good imaging quality and a compact configuration, the lens system 100 satisfies the following conditions:

$$0.45 < F2/F < 0.75; \quad (3)$$

$$Y1/X1 < 1.45; \quad (4)$$

Wherein: F2 is a focal length of the second lens L2; F is a focal length of the lens system 100; Y1 is the vertical height of the optically effective portion of the fourth surface S4, X1 is the horizontal height of the optically effective portion of the fourth surface S4.

In the embodiment, the lens system 100 further satisfies the following condition:

$$Vd2 > 47$$

and $$Vd3 < 35; \quad (5)$$

Wherein: Vd2 is the Abbe number of the second lens L2; Vd3 is the Abbe number of the third lens L3.

The fifth condition (5) is for overcoming problems of image performance associated with manufacturing errors of the lens system 100. When the condition Vd2>47 and Vd3<35 are met, it effectively reduces chromatic aberrations and improves imaging performance.

The first surface S1, the second surface S2, the third surface S3 and the fourth surface S4, the fifth surface S5, and the sixth surface S6 are aspherical surfaces. The aspherical surfaces are shaped according to the formula:

$$z = \frac{ch^2}{1 + \sqrt{1 - (k+1)c^2 h^2}} + \sum A_i h^i$$

wherein, h is the height from the optical axis to the surface, c is a vertex curvature (=1/R, the radius of curvature), k is a conic constant, and Ai are the correction coefficients, to the order of "i" of the aspherical surfaces, Z is the length of a line drawn from a point on the aspherical lens surface at a distance h from the optical axis to the tangential plane of the aspherical surface vertex.

Example diagrams of the lens system 100 will be described below with reference to FIGS. 2-4. It is to be understood that the disclosure is not limited to these examples. The following are symbols used in each exemplary embodiment.

ri: radius of curvature of the surface Si;
Di: distance between surfaces on the optical axis of the surface Si and the surface Si+1;
Ni: refractive index of the surface Si; and
Vi: Abbe constant of the surface Si;
Ki: Secondary curvature of the surface Si.

Tables 1-2 show a first specification of the exemplary embodiment of the lens system 100.

TABLE 1

| Surface | ri (mm) | Di (mm) | ni | vi | ki |
|---|---|---|---|---|---|
| S1 | 1.665 | 0.518 | 1.59 | 30 | 1.8794 |
| S2 | 2.875 | 0.216 | — | — | 12.5287 |

TABLE 1-continued

| Surface | ri (mm) | Di (mm) | ni | vi | ki |
|---|---|---|---|---|---|
| Aperture stop 10 | infinite | 0.185 | — | — | — |
| S3 | −3.095 | 1.274 | 1.55 | 55 | 7.7234 |
| S4 | −0.597 | 0.051 | — | — | −0.8699 |
| S5 | 1.671 | 0.372 | 1.59 | 30 | −7.7193 |
| S6 | 0.606 | 0.546 | — | — | −3.8831 |
| 20 | infinite | 0.610 | 1.517 | 64.167 | — |
| 30 | infinite | 0.050 | — | — | — |

TABLE 2

| Aspherical coefficient | Surface | | | | | |
| | S1 | S2 | S3 | S4 | S5 | S6 |
|---|---|---|---|---|---|---|
| A4 | 0.09388 | 0.34115 | −0.20554 | 0.29495 | −0.61534 | −0.37384 |
| A6 | 0.06468 | −0.77314 | −2.88745 | −0.87881 | 0.37065 | 0.26114 |
| A8 | −0.32790 | 2.32642 | 17.19915 | 1.43884 | −0.06025 | −0.12224 |
| A10 | 1.03631 | −4.50419 | −22.92991 | −1.36889 | −0.02870 | 0.03296 |
| A12 | −1.29737 | 5.11871 | −14.48691 | 0.03947 | 0.05088 | −0.00508 |
| A14 | 0.74675 | −6.30424 | −0.00074 | 0.60115 | −0.03027 | 0.00136 |
| A16 | — | — | — | — | 0.00547 | −0.00035 |

Figure 2:
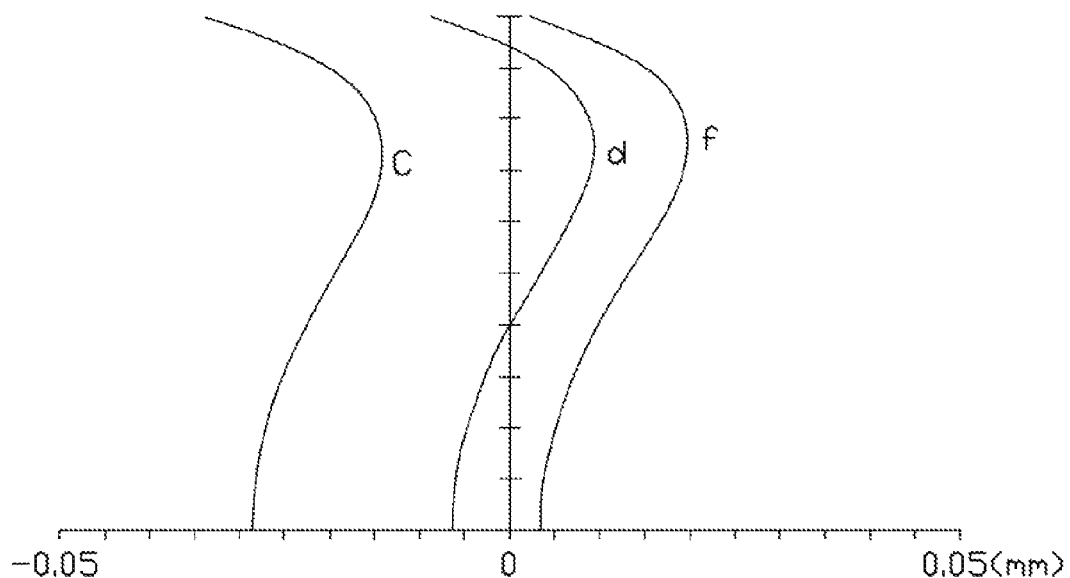
FIGS. 2-4 are graphs respectively showing spherical aberration, field curvature, and distortion of a first specification of the lens system of FIG. 1.
Figure 3:
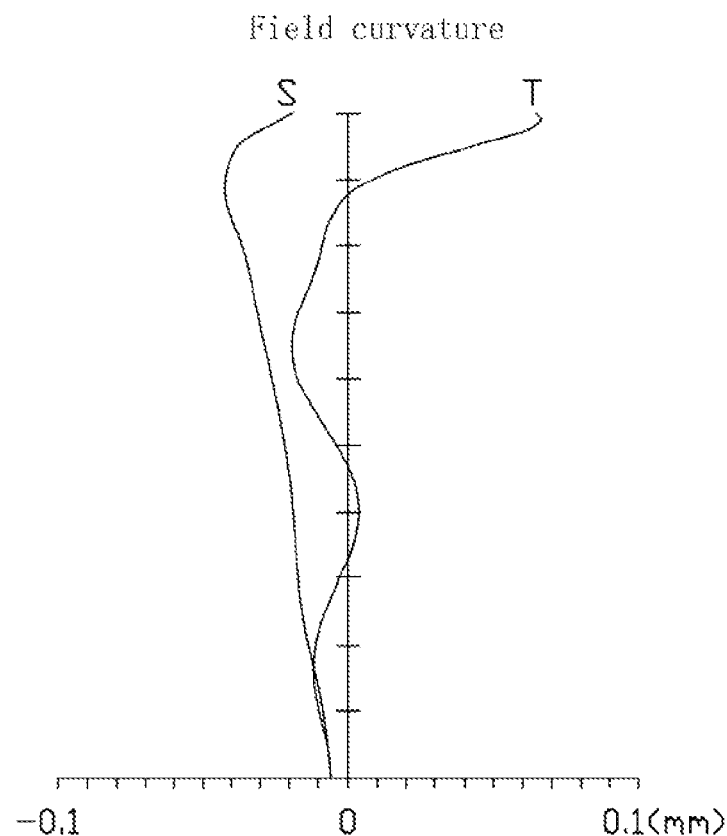
Figure 4:
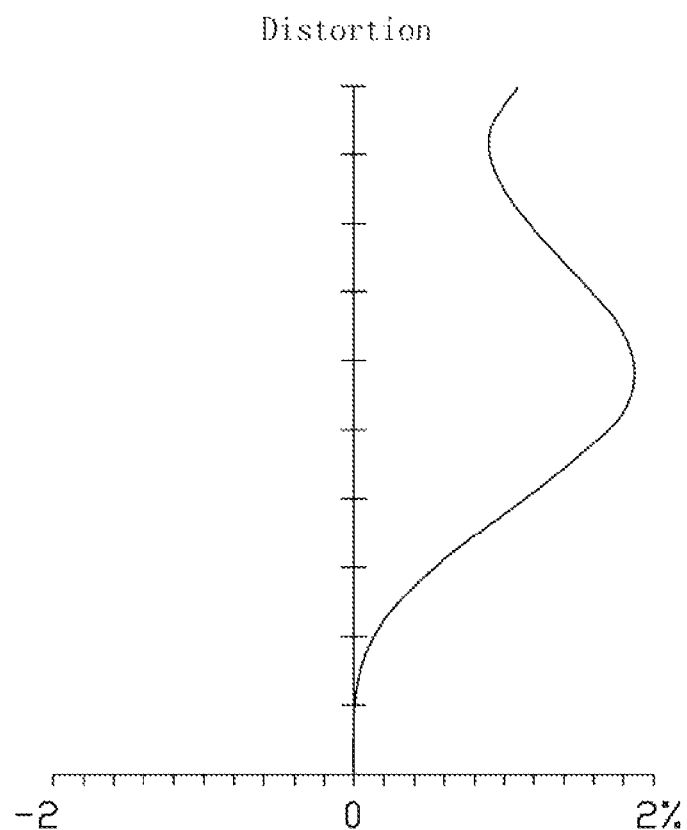

FIGS. 2-4, are graphs of aberrations (spherical aberration, field curvature, distortion, and lateral chromatic aberration) of the first specification of the exemplary embodiment of the lens system 100. In FIG. 2, curves are spherical aberration characteristic curves of F light (wavelength: 486.1 nm), d light (wavelength: 587.6 nm) and C light (wavelength: 656.3 nm) of the lens system 100. The spherical aberration of the first specification of the exemplary embodiment is from −0.05 mm to 0.05 mm. As illustrated in FIG. 3, the curves T and S are respectively the tangential field curvature curve and the sagittal field curvature curve. The field curvature of the first specification of the exemplary embodiment of the lens system 100 is from −0.1 mm to 0.1 mm. In FIG. 4, the distortion of the first specification of the exemplary embodiment of the lens system 100 is from −2% to 2%.

In the first specification, though the overall length of the lens system 100 is reduced, aberrations of the lens system 100 are maintained within an acceptable range. That is, the lens system 100 keeps chromatic aberrations at a minimum while reducing the total length of the lens system 100.

Tables 3-4 show a second specification of the exemplary embodiment of the lens system 100.

TABLE 3

| Surface | ri (mm) | Di (mm) | ni | vi | ki |
|---|---|---|---|---|---|
| S1 | 1.903 | 0.570 | 1.56 | 40 | 1.7236 |
| S2 | 3.617 | 0.254 | — | — | 14.1687 |
| Aperture stop 10 | infinite | 0.165 | — | — | — |
| S3 | −3.437 | 1.247 | 1.54 | 58 | 10.6808 |
| S4 | −0.588 | 0.050 | — | — | −0.8673 |
| S5 | 2.070 | 0.433 | 1.58 | 32 | −8.0093 |
| S6 | 0.638 | 0.635 | — | — | −4.1062 |
| 20 | infinite | 0.400 | 1.517 | 64.167 | — |
| 30 | infinite | 0.050 | — | — | — |

TABLE 4

| Aspherical coefficient | Surface | | | | | |
|---|---|---|---|---|---|---|
| | S1 | S2 | S3 | S4 | S5 | S6 |
| A4 | 0.09909 | 0.35090 | −0.22134 | 0.29340 | −0.59693 | −0.34477 |
| A6 | 0.05225 | −0.75112 | −2.45386 | −0.88076 | 0.36398 | 0.24809 |
| A8 | −0.31623 | 2.42650 | 15.53071 | 1.44601 | −0.05768 | −0.12425 |
| A10 | 1.03559 | −4.56561 | −21.84669 | −1.38373 | −0.02935 | 0.03489 |
| A12 | −1.30020 | 5.23645 | −14.48691 | 0.01632 | 0.05216 | −0.00507 |
| A14 | 0.68093 | −4.08605 | −0.00074 | 0.69065 | −0.03018 | 0.00134 |
| A16 | — | — | — | — | 0.00487 | −0.00037 |

Figure 5:
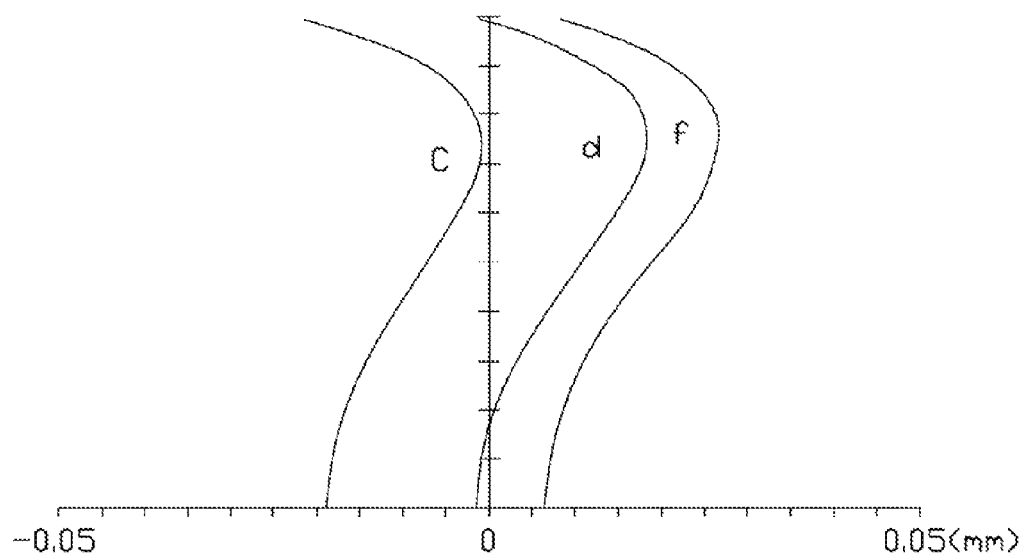
FIGS. 5-7 are graphs respectively showing spherical aberration, field curvature, distortion, and lateral chromatic aberration of a second specification of the lens system of the FIG. 1.
Figure 6:
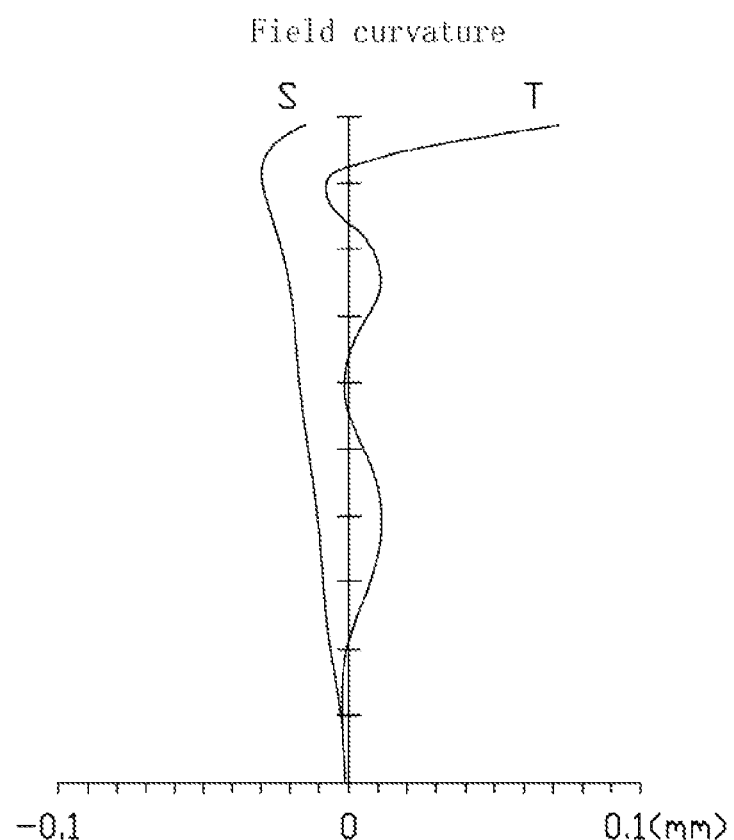
Figure 7:
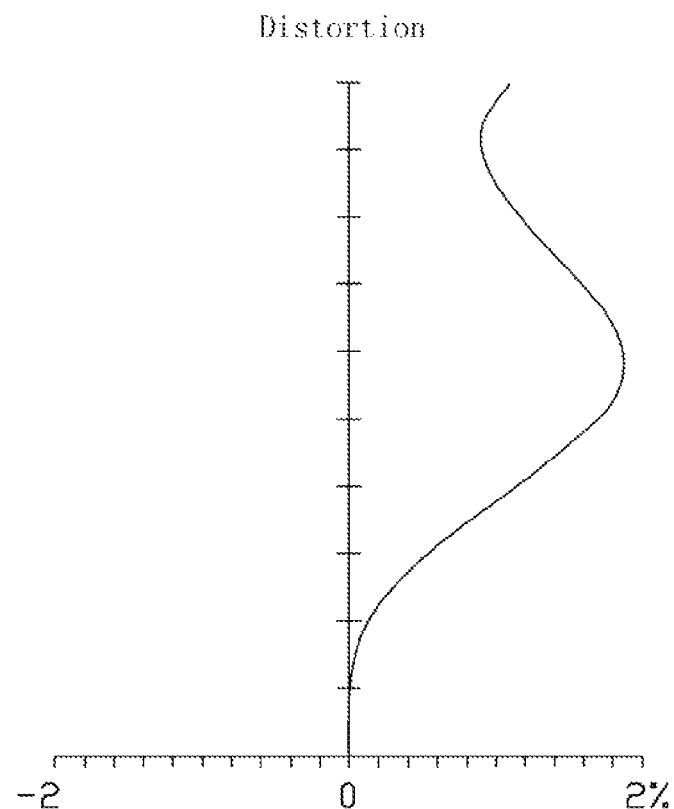

FIGS. 5-7, are graphs of aberrations (spherical aberration, field curvature, distortion, and lateral chromatic aberration) of the second specification of the exemplary embodiment of the lens system 100. In FIG. 5, curves are spherical aberration characteristic curves of F light (wavelength: 486.1 nm), d light (wavelength: 587.6 nm) and C light (wavelength: 656.3 nm) of the lens system 100. The spherical aberration of the second specification of the exemplary embodiment is from −0.05 mm to 0.05 mm. As illustrated in FIG. 6, the curves T and S are respectively the tangential field curvature curve and the sagittal field curvature curve. The field curvature of the second specification of the exemplary embodiment of the lens system 100 is from −0.1 mm to 0.1 mm. In FIG. 7, the distortion of the second specification of the exemplary embodiment of the lens system 100 is from −2% to 2%.

In the second specification, though the overall length of the lens system 100 is reduced, aberrations of the lens system 100 are maintained within an acceptable range. That is, the lens system 100 keeps chromatic aberrations at a minimum while reducing the total length of the lens system 100.

Tables 5-6 show a third specification of the exemplary embodiment of the lens system 100.

TABLE 5

| Surface | ri (mm) | Di (mm) | ni | vi | ki |
|---|---|---|---|---|---|
| S1 | 1.795 | 0.578 | 1.58 | 59 | 1.4138 |
| S2 | 3.510 | 0.243 | — | — | 10.7754 |
| Aperture stop 10 | infinite | 0.153 | — | — | — |
| S3 | −3.801 | 1.236 | 1.56 | 50 | 14.1972 |
| S4 | −0.600 | 0.081 | — | — | −0.8615 |
| S5 | 2.389 | 0.427 | 1.6 | 25 | −13.9079 |
| S6 | 0.643 | 0.609 | — | — | −4.4099 |
| 20 | infinite | 0.300 | 1.517 | 64.167 | — |
| 30 | infinite | 0.050 | — | — | — |

TABLE 6

| Aspherical coefficient | Surface | | | | | |
|---|---|---|---|---|---|---|
| | S1 | S2 | S3 | S4 | S5 | S6 |
| A4 | 0.08342 | 0.33252 | −0.23491 | 0.28990 | −0.61484 | −0.32880 |
| A6 | 0.06263 | −0.73958 | −2.34907 | −0.87926 | 0.37471 | 0.24323 |
| A8 | −0.31799 | 2.43129 | 16.64228 | 1.45126 | −0.05753 | −0.12170 |
| A10 | 1.02811 | −4.51461 | −28.04916 | −1.39766 | −0.02883 | 0.03321 |
| A12 | −1.31985 | 5.63367 | −13.52066 | 0.11436 | 0.05163 | −0.00516 |
| A14 | 0.70862 | −5.04587 | −0.91731 | 0.60182 | −0.03074 | 0.00136 |
| A16 | — | — | — | — | 0.00475 | −0.00033 |

Figure 8:
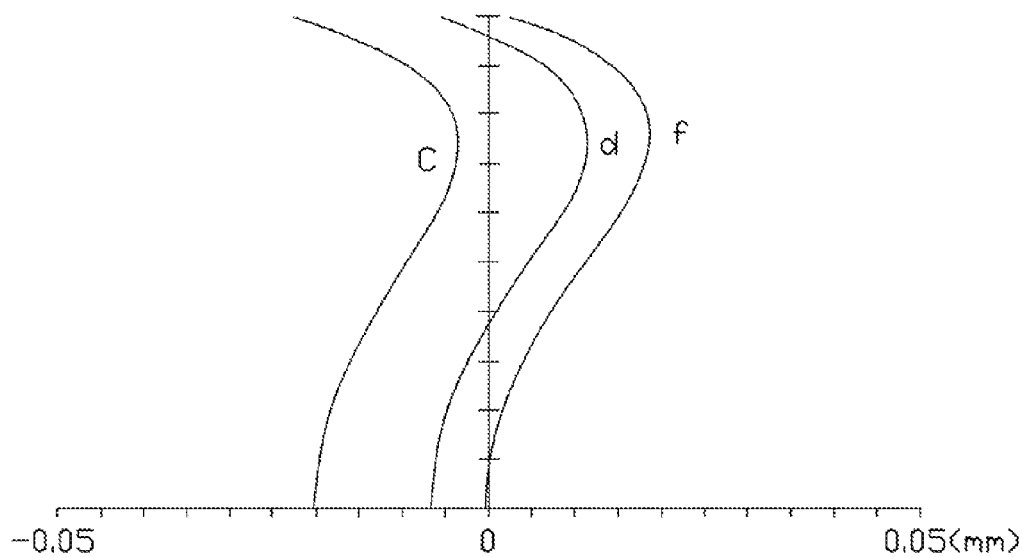
FIGS. 8-10 are graphs respectively showing spherical aberration, field curvature, distortion, and lateral chromatic aberration of a third specification of the lens system of the FIG. 1.
Figure 9:
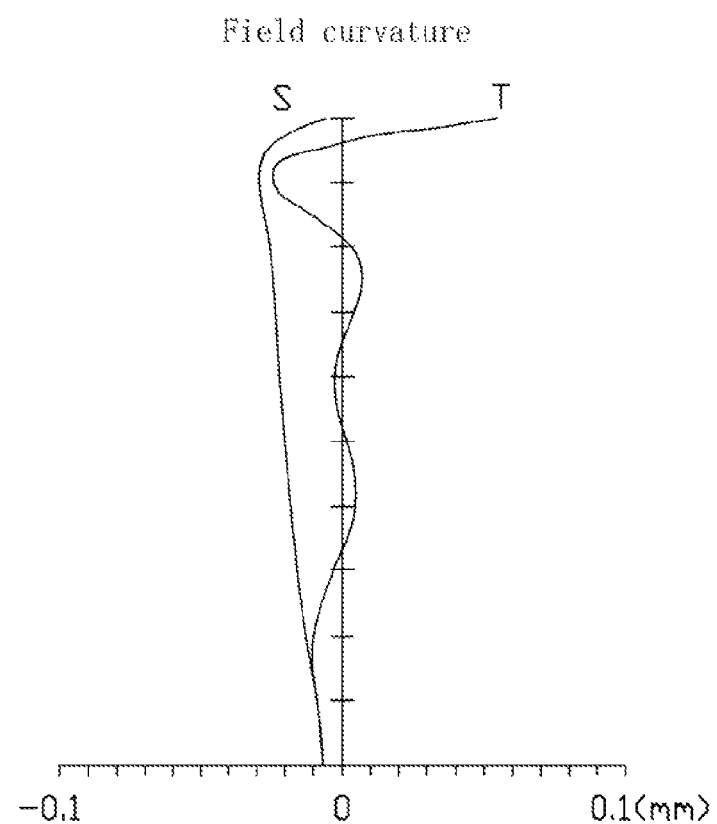
Figure 10:
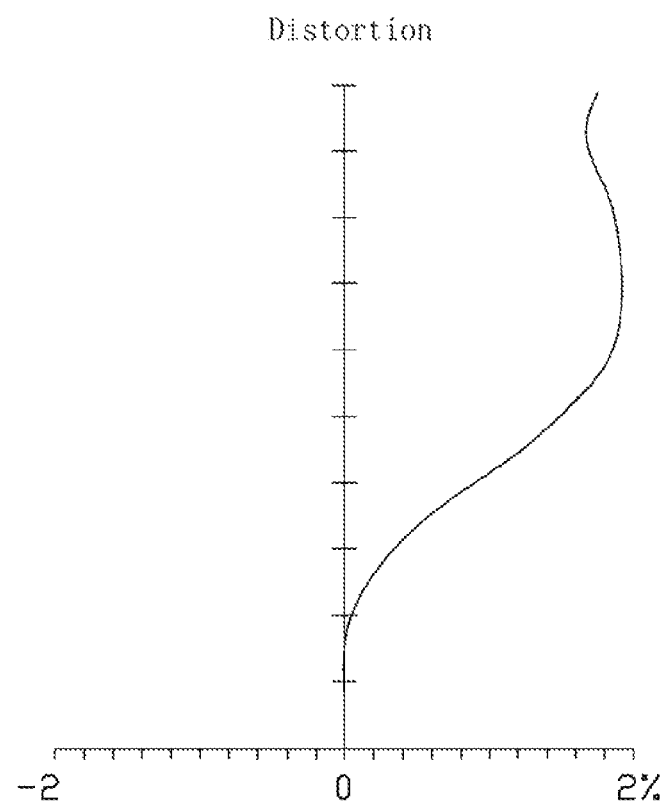

FIGS. 8-10, are graphs of aberrations (spherical aberration, field curvature, distortion, and lateral chromatic aberration) of the third specification of the exemplary embodiment of the lens system 100. In FIG. 8, curves are spherical aberration characteristic curves of F light (wavelength: 486.1 nm), d light (wavelength: 587.6 nm) and C light (wavelength: 656.3 nm) of the lens system 100. The spherical aberration of the lens system 100 of the third specification of the exemplary embodiment is from −0.05 mm to 0.05 mm. As illustrated in FIG. 9, the curves T and S are respectively the tangential field curvature curve and the sagittal field curvature curve. The field curvature of the third specification of the exemplary embodiment of the lens system 100 is from −0.1 mm to 0.1 mm. In FIG. 10, the distortion of the third specification of the embodiment of the lens system 100 is from −2% to 2%.

While certain embodiments have been described and exemplified above, various other embodiments will be apparent to those skilled in the art from the foregoing disclosure. The disclosure is not limited to the particular embodiments described and exemplified, and the embodiments are capable of considerable variation and modification without departure from the scope of the appended claims.

What is claimed is:
1. A lens system, in the order from the object-side to the image-side of the lens system, comprising:
    a first lens with positive refraction power, from the object-side to the image-side of the lens system, comprising a first surface and a second surface;
    a second lens with positive refraction power;
    a third lens with negative positive refraction power; and
    an image plane;

wherein the lens system satisfies the following conditions:

$$0.26 < R1/F1 < 0.35;$$

and $$-0.65 < R2/F2 < -0.35;$$

wherein, R1 is a radius of curvature of the first surface; F1 is a focal length of the first lens; R2 is a radius of curvature of the second surface; F2 is a focal length of the second lens.

2. The lens system of claim 1, further comprising an aperture stop, wherein the aperture stop is installed between the first lens and the second lens.

3. The lens system of claim 1, wherein the second lens, from the object-side to the image-side of the lens system, comprises a third surface and a fourth surface, the lens system further satisfies the conditions:

$$0.45 < F2/F < 0.75;$$

$$Y1/X1 < 1.45;$$

wherein, F2 is a focal length of the second lens; F is a focal length of the lens system; Y1 is the vertical height of the optically effective portion of the fourth surface, X1 is the horizontal height of the optically effective portion of the fourth surface.

4. The lens system of claim 3, wherein the third surface is concave toward the object-side of the lens system, and the fourth surface is convex toward the image-side of the lens system.

5. The lens system of claim 3, wherein both the third surface and the fourth surfaces are aspherical.

6. The lens system of claim 1, wherein the lens system further satisfies the conditions:

$$Vd2 > 47$$

and $$Vd3 < 35;$$

wherein, Vd2 is the Abbe number of the second lens; Vd3 is the Abbe number of the third lens.

7. The lens system of claim 1, wherein the first surface is convex toward the object-side, and the second surface is concave toward the image-side of the lens system.

8. The lens system of claim 1, wherein the first surfaces and second surfaces are aspherical.

9. The lens system of claim 1, wherein the third lens comprises a fifth surface and a sixth surface from the object-side to the image-side of the lens system, a portion of the fifth surface close to an optical axis of the lens system is convex toward the object-side, and a portion of the sixth surface close to the optical axis of the lens system is concave toward the image-side of the lens system.

10. The lens system of claim 9, wherein both the fifth surface and the sixth surface are aspherical.

11. The lens system of claim 1, further comprising a color filter, wherein the color filter is arranged between the image plane and the third lens.

* * * * *

UNITED STATES PATENT AND TRADEMARK OFFICE
CERTIFICATE OF CORRECTION

PATENT NO. : 8,345,359 B1  
APPLICATION NO. : 13/236618  
DATED : January 1, 2013  
INVENTOR(S) : Kuo-Yen Laing Page 1 of 1

It is certified that error appears in the above-identified patent and that said Letters Patent is hereby corrected as shown below:

On the title page insert the following:

--(30)     Foreign Application Priority Data  
August 25, 2011     (TW) .................... 100130590--

Signed and Sealed this  
Twenty-sixth Day of November, 2013

Margaret A. Focarino  
*Commissioner for Patents of the United States Patent and Trademark Office*